United States Patent [19]
Kaufman et al.

[11] Patent Number: 5,491,752
[45] Date of Patent: Feb. 13, 1996

[54] SYSTEM FOR INCREASING THE DIFFICULTY OF PASSWORD GUESSING ATTACKS IN A DISTRIBUTED AUTHENTICATION SCHEME EMPLOYING AUTHENTICATION TOKENS

[75] Inventors: Charles W. Kaufman, Northborough; Radia J. Pearlman, Acton; Morrie Gasser, Hopkinton, all of Mass.

[73] Assignee: Digital Equipment Corporation, Patent Law Group, Maynard, Mass.

[21] Appl. No.: 300,576

[22] Filed: Sep. 2, 1994

Related U.S. Application Data

[63] Continuation of Ser. No. 34,225, Mar. 18, 1993, abandoned.
[51] Int. Cl.⁶ .................................................... H04K 1/00
[52] U.S. Cl. ................................................ 380/30; 380/25
[58] Field of Search ................................. 380/23, 24, 25, 380/30

[56] References Cited

U.S. PATENT DOCUMENTS

| | | | |
|---|---|---|---|
| 3,798,605 | 3/1974 | Feistel | 380/25 |
| 3,996,449 | 12/1976 | Attanasio et al. | 235/61.7 R |
| 4,218,738 | 8/1980 | Matyas et al. | 380/25 |

(List continued on next page.)

OTHER PUBLICATIONS

1989, Mark, T., et al, "Reducing Risks from Poorly Chosen Keys," University of Cambridge Computer Laboratory, from 12th Symposium On Operating System Principles.
Security Dynamics, Inc., "Kerberos and SecurID," approximately Apr. 1992, not published.
Lomas et al., "Reducing Risks from Poorly Chosen Keys," 12th Symposium on Operating System Principles, 1989, pp. 14–18, place of pub. unknown.
Tardo et al., "SPX: Global Authentication Using Public Key Certificates," Proceedings of IEEE Symposium Research in Security and Privacy, IEEE CS Press, 1991, pp. 232–244, place of publication unknown.
Abadi et al., "Authentication and Delegation with Smart–Cards," Oct. 22, 1990, pp. 1–24, place of publication unknown.
Woo et al., "Authentication for Distributed Systems," from Computer of IEEE Computer Society, Jan. 1992, pp. 49–51, place of pub. unknown.
U.S. application Ser. No. 07/875,050, filed Apr. 28, 1992, Kaufman et al.

*Primary Examiner*—Tod R. Swann
*Attorney, Agent, or Firm*—A. Sidney Johnston

[57] ABSTRACT

An improved security system inhibits eavesdropping, dictionary attacks, and intrusion into stored password lists. In one implementation, the user provides a workstation with a "password", and a "token" obtained from a passive authentication token generator. The workstation calculates a "transmission code" by performing a first hashing algorithm upon the password and token. The workstation sends the transmission code to the server. Then, the server attempts to reproduce the transmission code by combining passwords from a stored list with tokens generated by a second identical passive authentication token generator just prior to receipt of the transmission code. If any password/token combination yields the transmission code, the workstation is provided with a message useful in communicating with a desired computing system; the message is encrypted with a session code calculated by applying a different hashing algorithm to the password and token. In another embodiment, the workstation transmits a user name to the authentication server. The server verifies the user name's validity, and uses an active authentication token generator to obtain a "response" to an arbitrarily selected challenge. The server generates a session code by performing a hashing algorithm upon the response and the password. The server sends the challenge and a message encrypted with the session code to the workstation. The workstation generates the session code by performing the hashing algorithm on the password and the received challenge, and uses the session code to decrypt the encrypted message. The message is useful in communicating with a desired computing system.

37 Claims, 7 Drawing Sheets

U.S. PATENT DOCUMENTS

| | | | |
|---|---|---|---|
| 4,227,253 | 10/1980 | Ehrsam et al. | 375/2 |
| 4,264,782 | 4/1981 | Konheim | 178/22 |
| 4,288,659 | 9/1981 | Atalla | 178/22.08 |
| 4,386,266 | 5/1983 | Chesarek | 235/380 |
| 4,399,323 | 8/1983 | Henry | 178/22.14 |
| 4,430,728 | 2/1984 | Beitel et al. | 340/825.31 X |
| 4,626,845 | 12/1986 | Ley | 380/23 X |
| 4,661,991 | 4/1987 | Logemann | 340/825.31 X |
| 4,736,423 | 4/1988 | Matyas | 380/23 |
| 4,755,940 | 7/1988 | Brachtl et al. | 364/408 |
| 4,799,061 | 1/1989 | Abraham et al. | 340/825.34 |
| 4,815,031 | 3/1989 | Furukawa | 380/23 X |
| 4,868,877 | 9/1989 | Fischer | 380/25 |
| 4,881,264 | 11/1989 | Merkle | 380/25 |
| 4,910,773 | 3/1990 | Hazard et al. | 380/21 |
| 4,919,545 | 4/1990 | Yu | 380/25 |
| 4,924,515 | 5/1990 | Matyas et al. | 380/25 |
| 4,932,056 | 6/1990 | Shamir | 380/23 |
| 4,965,568 | 10/1990 | Atalla et al. | 340/825.34 |
| 4,974,193 | 11/1990 | Beutelspacher | 364/900 |
| 4,993,068 | 2/1991 | Piosenka et al. | 380/23 |
| 5,023,908 | 6/1991 | Weiss | 380/23 |
| 5,029,208 | 7/1991 | Tanaka | 380/30 X |
| 5,050,212 | 9/1991 | Dyson | 380/25 |
| 5,068,894 | 11/1991 | Hoppe | 380/23 |
| 5,081,678 | 1/1992 | Kaufman et al. | 380/21 |
| 5,109,152 | 4/1992 | Takagi et al. | 235/380 |
| 5,136,646 | 8/1992 | Haber et al. | 380/49 |
| 5,136,647 | 8/1992 | Haber et al. | 380/49 |
| 5,146,499 | 9/1992 | Geffrotin | 380/23 |
| 5,148,479 | 9/1992 | Bird et al. | 380/23 |
| 5,163,096 | 11/1992 | Clark et al. | 380/4 |
| 5,201,000 | 4/1993 | Matyas et al. | 380/30 |
| 5,204,966 | 4/1993 | Wittenberg et al. | 380/25 X |
| 5,220,604 | 6/1993 | Gasser et al. | 380/23 |
| 5,224,163 | 6/1993 | Gasser et al. | 380/30 |
| 5,235,644 | 8/1993 | Gupta et al. | 380/48 |
| 5,297,206 | 3/1994 | Orton | 380/30 |
| 5,315,658 | 5/1994 | Micali | 380/30 |

SYSTEM FOR INCREASING THE DIFFICULTY OF PASSWORD GUESSING ATTACKS IN A DISTRIBUTED AUTHENTICATION SCHEME EMPLOYING AUTHENTICATION TOKENS

This application is a file-wrapper continuation, of application Ser. No. 08/034,225, filed Mar. 18, 1993, which is now abandoned.

BACKGROUND OF INVENTION

The present invention relates to an improved method by which a user or other principal in a computing system may authenticate to a computer system and establish a shared secret key for the protection of subsequent messages, with reduced risk that the information in question will be improperly obtained or modified by a would-be intruder or imposter.

In one aspect, the invention pertains to a method by which a server in a distributed computing system may authenticate a user, authorizing access by the user to specified system resources and establishing a shared secret key with which to protect subsequent messages. In a specific embodiment, the invention pertains to a method by which an authentication server in a distributed computing system may transmit an authentication "ticket" to a user, authorizing access by the user to specified system resources. In a related aspect, the invention pertains to a method of increasing the difficulty of password guessing attacks in a distributed authentication scheme that employs authentication tokens.

PASSWORD-BASED CONTROL OF ACCESS TO COMPUTER SYSTEM RESOURCES

Many large computing systems include "resources" such as one or more central processing units, main memories, disk and/or tape storage units, and printers. Such a system may also include user terminals such as workstations; in many implementations, each user terminal may have its own local resources such as one or more central processing units, an associated main memory, a printer, and a disk or tape storage. In the present application, it is understood that "workstation" includes other user terminals that are not necessarily sold as "workstations," such as personal computers.

Different approaches have been used to maintain the security of system resources from unauthorized access. Quite commonly, a "principal" (e.g., a user) desiring access to a system resource must identify himself to a security management authority with a user name and a password. (The masculine gender is used throughout this specification solely for convenience.) The security management authority may be part of the operating system of a timesharing computing system, or it may be an authentication server in a distributed computing system. The user name and password typically are associated with an "account" on the computer system; each account normally has associated with it a set of access privileges to specified system resources.

Figure 1:
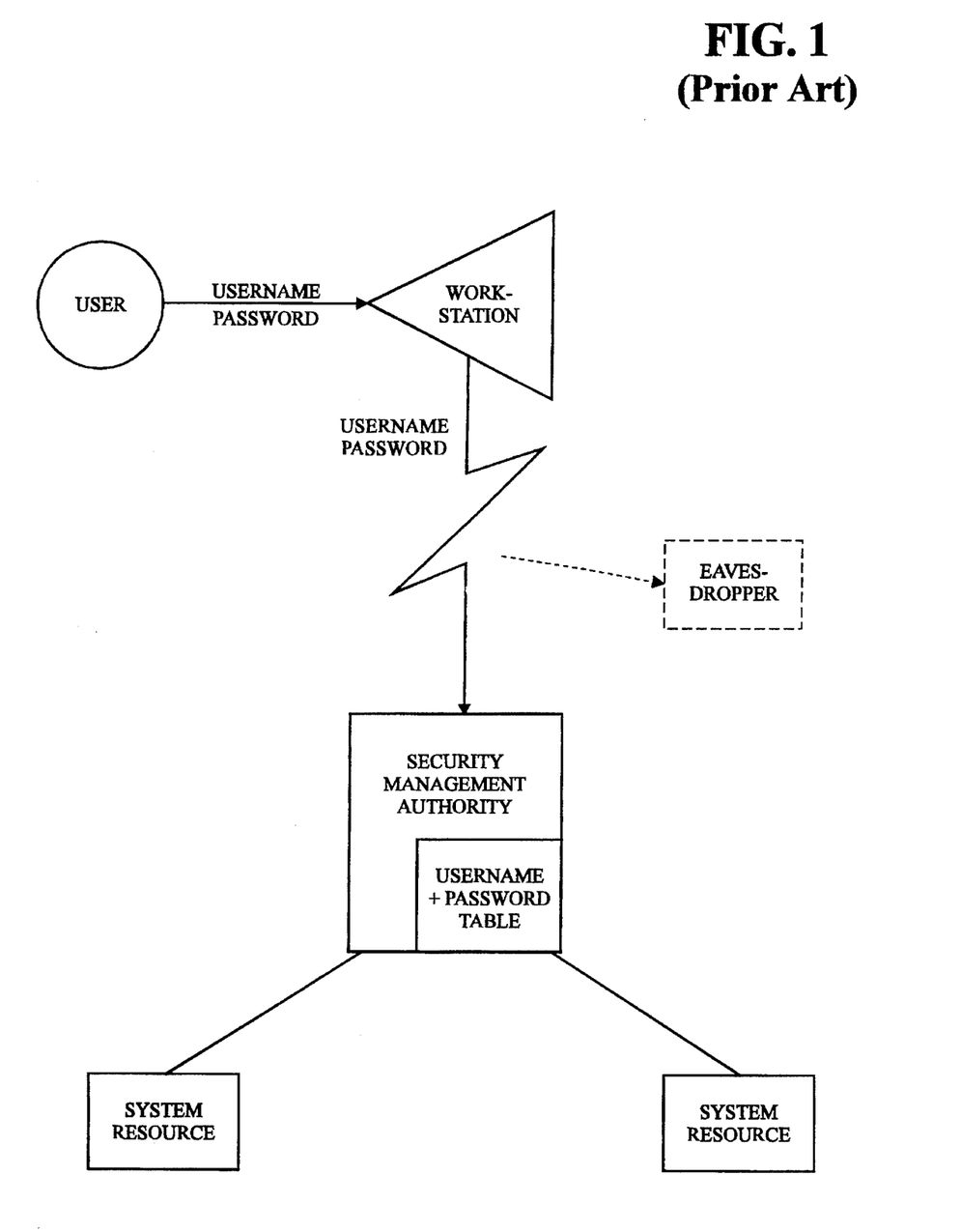
FIG. 1 is a block diagram of a typical password-based access control system.

As illustrated in FIG. 1 in greatly simplified form, a user normally attempts to log in to the system by, for example, entering a user name and a password at a workstation. The security management authority checks whether the user name is associated with a valid account, and whether the password is the correct password for that account. If so, the security management authority presumes that the user is authorized to have access to system resources as specified for that account. That is, the user name and password, taken together, serve to identify and "authenticate" the user at login time.

DICTIONARY ATTACKS ON PASSWORD SECURITY

An authentication system based solely on passwords and user names is open to attack by would-be intruders. User names often are not difficult for unauthorized persons to determine; for example, a user name may be the publicly known electronic mail address of the user. Furthermore, when users are allowed to select their own passwords, they tend to choose passwords that are easily remembered; often these can be easily guessed as well. Indeed one common threat to a password-based authentication system is an impostor that attempts to guess the password associated with a valid user name. Through the use of an automated system configured to generate character sequences at a high rate, the impostor can perform an "exhaustive search" by quickly "guessing" large numbers of character sequences. When guesses are limited to common names and words taken from a list called a "dictionary," this type of search is sometimes called a "dictionary attack" on the password.

A dictionary attack can be prevented fairly easily in a centralized computing system such as a timesharing system or a stand-alone computer, by authenticating users with the system's operating system software. Upon presentation of a user name and a password during a login procedure, the operating system software would verify the identity of the user by checking the presented user name and password against a list of valid user names and passwords. If too many wrong guesses occur, the operating system can intercede by disabling access to the account being attacked by, for example, disconnecting a dial-up telephone line or by disabling the account itself.

COUNTERMEASURES AGAINST PASSWORD-AUTHENTICATION DICTIONARY ATTACKS IN DISTRIBUTED SYSTEMS

A dictionary attack can be more difficult to prevent in a distributed computing system. In such a system, several separate computer "subsystems" are typically linked together in a network to share various system resources. These systems generally lack a trusted central authority to implement a security policy for the system.

Each system resource on the network may implement its own security policy, in which each system resource is responsible for determining the access rights of each requester and allowing or rejecting the requested access. When each resource must enforce its own security policy, complexities of a kind not encountered in centralized computing environments are often seen. For example, if each system resource must maintain its own listing of all of the principals and their respective access rights and user names, then additional memory and maintenance is required for each resource. Further, if numerous system resources exist, then the addition or deletion of one or more principals would require the modification of numerous lists.

One known alternative is to utilize a central list that is accessible to all resources on the network. Because all system resources generally must have access to all of the principals and their names, a list of the principals and their names is often stored in a "global authentication service." A global authentication service is a system resource that contains a list of all of the principals authorized to use the system and their names. Unlike a timesharing environment, where the naming service is centrally controlled, in a distributed environment the naming service is merely one of many system resources.

COUNTERMEASURES AGAINST PASSWORD EAVESDROPPING

Another password-security problem, especially but not exclusively occurring in distributed computing systems, is that of the "eavesdropper." Because distributed systems generally have several workstations, it is desirable to allow a user to access the system resources regardless of which workstation he is logged into. However, all workstations on the network may not be equally trustworthy; for example, some workstations might be in secure and locked rooms while others might be publicly accessible. Moreover, many distributed systems require that a user who desires to use system resources located at various remote nodes must send his password to each node. In such an environment, unauthorized interception of the password by wiretapping the network may be possible, as illustrated in FIG. 1. If successful, eavesdropping can result in the impersonation of the user by an imposter who has intercepted the user's password.

To counter the eavesdropping threat, encryption using a secret encryption key shared by the workstation and the remote system resource is often used to preserve the confidentiality of the transmitted password when authenticating the user to remote nodes. Although this type of protection is difficult to defeat with an exhaustive search, this method has practical logistical problems in that it is often difficult to establish the required keys between the workstation and the remote system resource. In another technique, the password is never passed between the workstation and the remote system resource; instead, the password is used as a key to encrypt information between the workstation and the remote system resource. However, this method is subject to dictionary attacks using likely passwords to try and decrypt the messages.

REMOTE AUTHENTICATION VIA PUBLIC/PRIVATE KEY ENCRYPTION

Figure 2:
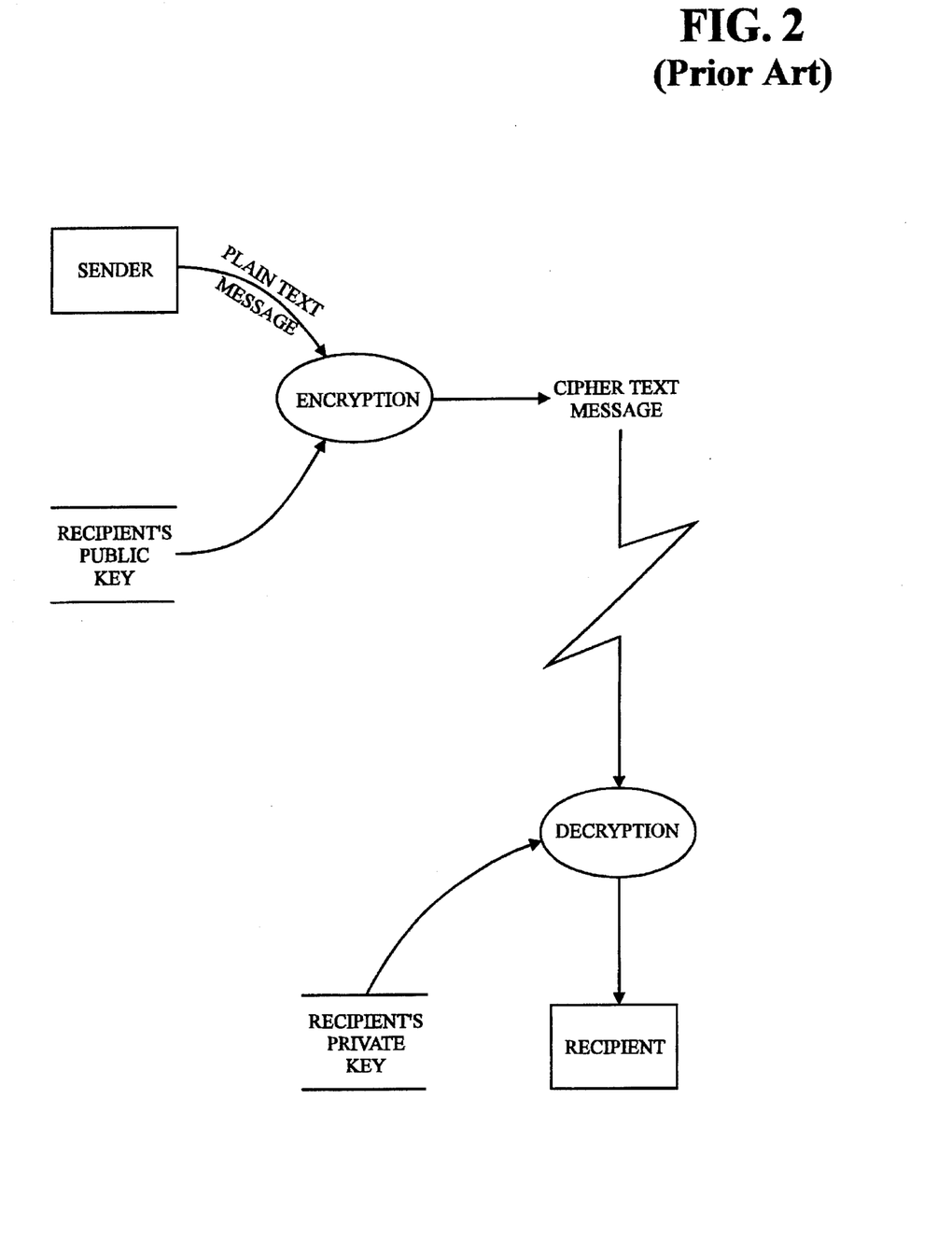
FIG. 2 is a data flow diagram of a typical public key encryption transmission.

A well-known cryptographic technique used to perform remote authentication is "public key" cryptography, illustrated in greatly simplified form in FIG. 2. In this method of secure communication, each principal has a public encryption key and a private encryption key. The private key is known only to the owner of the key, while the public key is known to other principals in the system. In effect, the public and private keys are mirror images of one another: messages encrypted with the public key can be decrypted only with the private key, and vice versa.

To effect a secure transmission of information to a recipient, a sender encrypts the information with the recipient's public key. Because only the intended recipient has the complementary private key, only that recipient can decrypt it. Public key cryptography is also called "asymmetric" encryption because information encoded with one key of the pair may be decoded only by using the other key in the pair. One example of a public key technique is the well-known R.S.A. encryption scheme discussed in U.S. Pat. No. 4,405,829 to Rivest et al. In R.S.A. cryptography, a principal's public and private keys are selected such that the encryption and decryption transformations that they effect are mutual inverses of each other and the sequential application of both transformations, in either order, will first encode the information and then decode it to restore the information to its original form.

Figure 3:
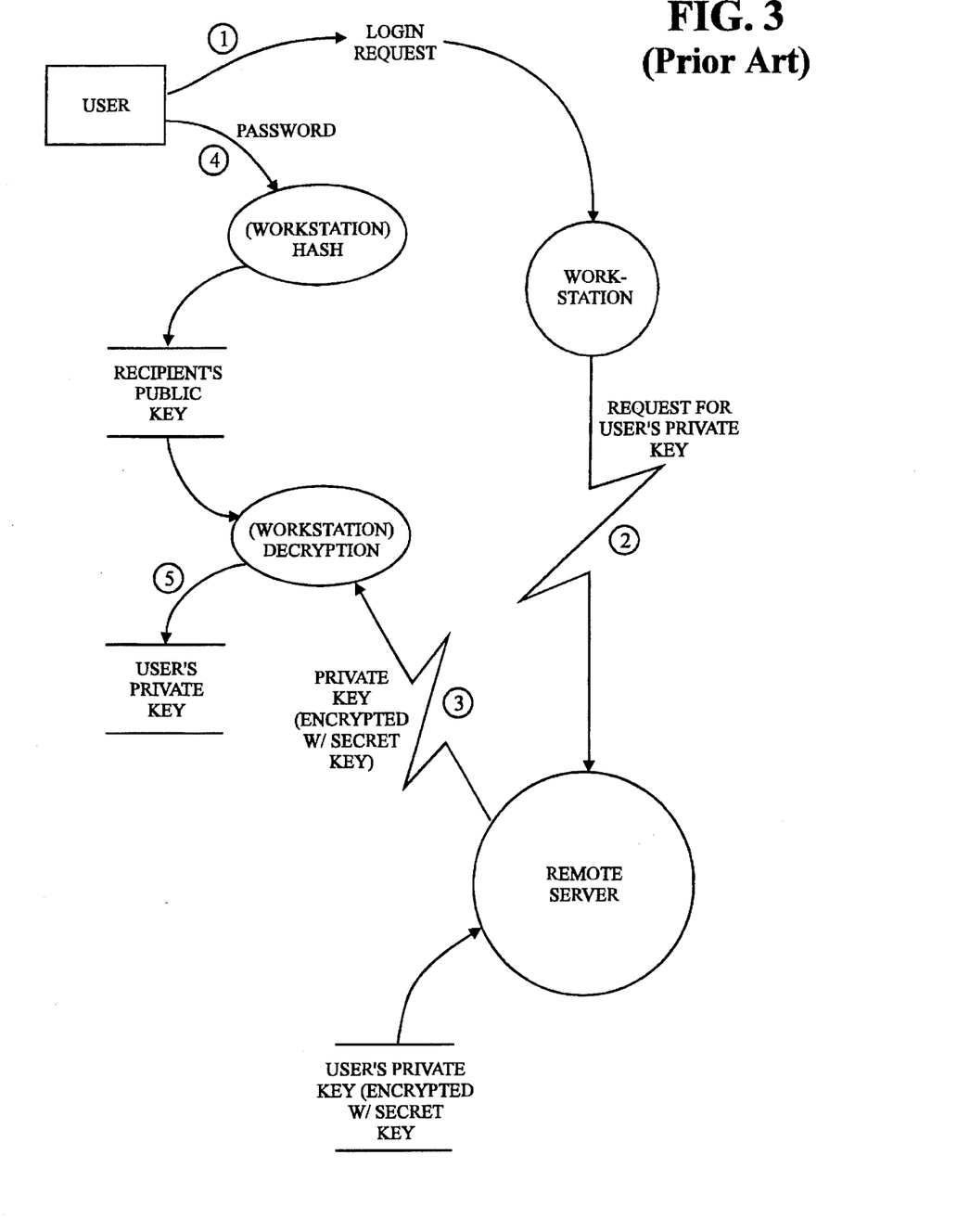
FIG. 3 is a data flow diagram of a public key authentication transaction.

Public key cryptography can be used in a login authentication exchange between a workstation, acting on behalf of a user, and a remote server. In a hypothetical example, shown in FIG. 3, a user logs into the workstation by typing in the user's password. The workstation derives a secret, "symmetric" encryption key by applying a nonsecret (and indeed perhaps generally known) "hashing algorithm" to the password. The workstation then requests the user's private key from a directory service at the remote server. The user's private key has previously been encrypted under the same secret encryption key and stored as part of a "credential" in the directory. (A credential is a table entry comprising the user's name, as well as the user's private key encrypted with the hashed password; in other words, the credential is a representation of the user in the computer.) The remote server returns the encrypted private key to the workstation, which uses the secret key to decrypt and obtain the private key.

A vulnerability of this password-based authentication is that the encrypted private key is transmitted over the network from the remote server to the workstation. Because knowledge of the password is not needed to initiate the request, an impostor can easily request a copy of the encrypted message. Equipped with a copy of the encrypted message, the impostor can attempt to decrypt the message by guessing various passwords and hashing them with the known hashing algorithm to form the secret key. In other words, the impostor need only request the encrypted message once and, thereafter, it can continuously attempt to decipher the message on its own computer without the risk of being audited or detected by the network. The impostor knows it has successfully derived the secret key and decrypted the message if the decrypted result yields an intelligible, valid private key. An impostor that can demonstrate possession of the private key may thus access system resources, purportedly on behalf of the user.

One known approach to solving this problem makes use of public key cryptography to enhance the security of a system that is primarily based on secret key authentication. Such an approach employs a method to ensure that the contents of messages exchanged over the network are unintelligible to an impostor, even if the impostor has correctly decrypted a captured message. According to the method, the workstation generates a random bit string to which is concatenated a hashed version of the user's password. This item of data is encrypted under the authentication server's public key and forwarded, together with the user name, as a message to the authentication server. The authentication server decrypts the message with its private key and checks that the workstation supplied the correct hash total for the user's password. If so, the server creates a ticket for the user and performs an exclusive-OR function on the ticket and the random bit string. The result of this latter operation is encrypted under the user's password hash value and returned as a message to the workstation. Because the impostor does not know the random bit string, it cannot distinguish between successful and unsuccessful decryptions of the message. This is because there is no information in a successfully decrypted message that would indicate that the decryption was successful. An example of this approach is discussed in Lomas et al., "Reducing Risks from Poorly Chosen Keys," 12th Symposium on Operating System Principles, 1989, pp. 14–18.

The authentication server of the secret key system, then, must have knowledge of the user's password. If the authentication server is compromised by an impostor, the impostor could use its knowledge of the password to impersonate the user. A significant advantage of a public key cryptography system lies in the fact that only the user has access to the user's private key. Yet, the lack of a trusted, on-line agent to oversee the login process makes the described form of public key distributed system particularly vulnerable to a dictionary attack.

KERBEROS: USING A SHARED SECRET KEY FOR TRANSMISSION OF AN AUTHENTICATION "TICKET"

Figure 4:
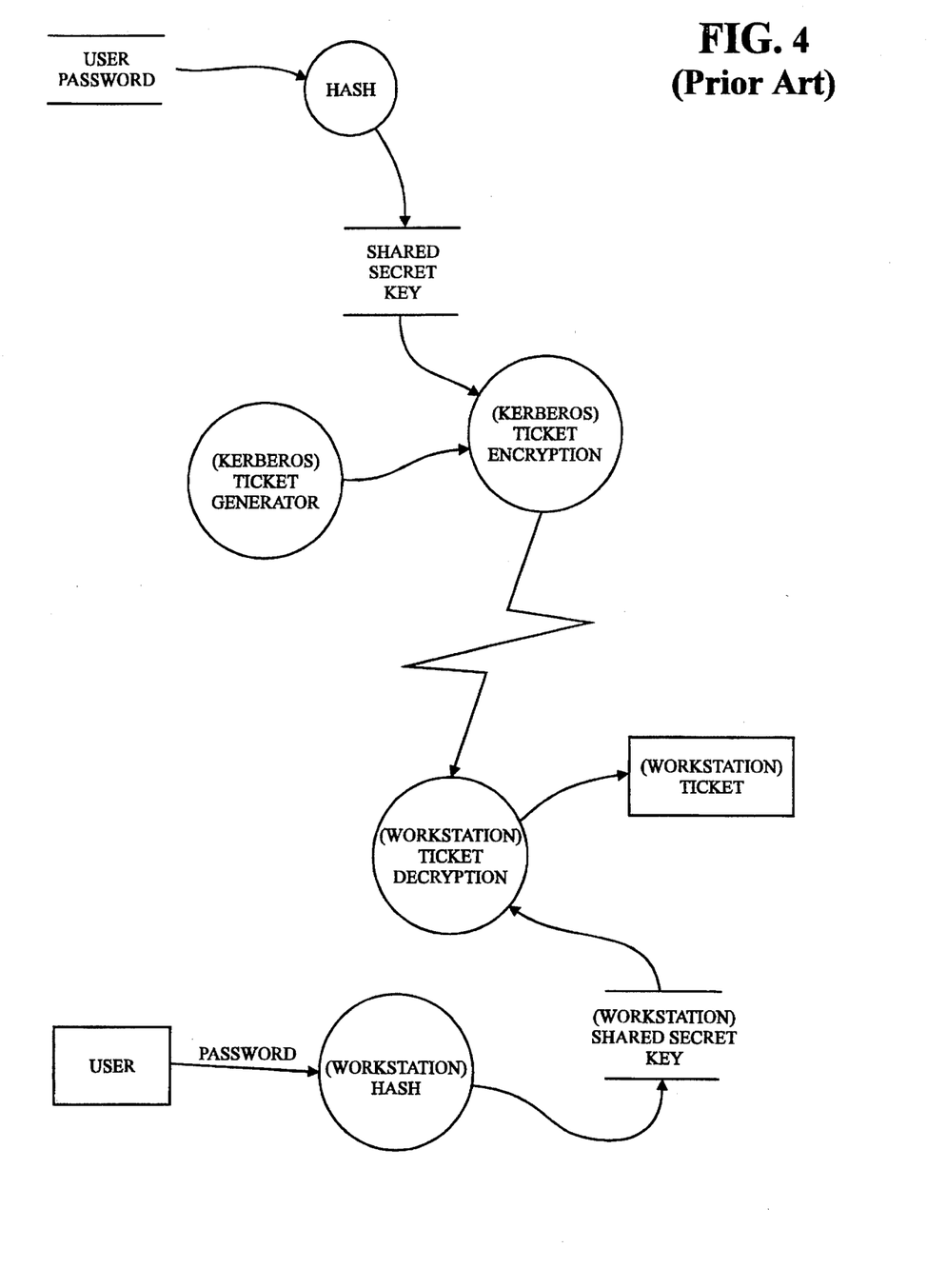
FIG. 4 is a data flow diagram of an authenticated Kerberos network environment.

The well-known Kerberos network environment employs another variation on the basic password-authentication approach, which gives rise to a need to establish a shared secret key between the user's workstation and a remote authentication server. An example of such a system is illustrated in greatly simplified form in FIG. 4. In Kerberos, the authentication server uses this shared key to encrypt a "ticket" that, upon successful decryption by the workstation, gives the workstation the ability to access services in the network. If an eavesdropper can capture the encrypted ticket and decipher it, the eavesdropper can impersonate the user.

In Kerberos, the shared key used to encrypt the ticket is based on the user's password; the authentication server knows the user's password because it is stored at the authentication server, and the workstation learns the password when the user types it in at login time. More specifically, a hash of the password is typically used to form the key since the password is an alphanumeric string and the key commonly must be a number. However, as discussed above, any user-selected password is vulnerable to dictionary attack.

One technique to counter the dictionary attack on passwords in a network environment is entitled "Method and Apparatus for Protecting the Confidentiality of Passwords in a Distributed Data Processing System", filed on Apr. 28, 1992 in the names of Charles W. Kaufman et al., and identified as U.S. Ser. No. 07/875,050; this technique requires the authentication server to receive proof that the user's workstation already knows the password before returning a ticket encrypted with the password as the key.

HARDWARE-BASED AUTHENTICATION "TOKENS"

Another known authentication method makes use of a separate item of hardware referred to as an "authentication token generator." Generally, authentication token generators provide some sort of authenticating code that a user or a workstation utilizes in accessing a computing system. One example of an authentication token generator is referred to colloquially as the "smart card." In some applications, the authentication token generator is a "stand-alone" device that commonly resembles a credit card or calculator with a window that continuously displays a number that changes every few seconds. This number, which is called a "token," is typically a function of (a) the date and time and (b) a secret key, unique to the particular token generator, that is stored in the token generator and also is known to the authentication server. This type of token generator will be referred to herein as a "passive" token generator, because it continuously provides tokens without requiring any user input.

Another known type of authentication token generator provides a token that is a function of (1) a secret key unique to the authentication token generator, and (2) a "challenge" value supplied by the server and entered by the user into the keyboard of the authentication token generator. This type of token generator will be referred to as an "active" token generator, since it actively provides a particular token in response to a specific user input.

To login at a workstation, a user first receives a token furnished by the authentication token generator, typically by reading the token from the token generator's display. Then the user types the token in at the workstation's keyboard, and the workstation sends the token to the authentication server. The authentication server, which knows the token generator's secret key, performs the same computations as the token generator to generate a token and compares it with the token typed by the user. If a match is not obtained, the authentication server rejects the login attempt. Often, an authentication token is used in addition to a user-chosen password.

An authentication token generator reduces the vulnerability of users who pick poor passwords that are easy to guess, but the device cannot be readily applied to a network environment such as Kerberos, where the workstation at which the user logs in also must securely receive a ticket from the authentication server. To use an authentication token generator with Kerberos, the user could type the token and password into a workstation, and the workstation could forward something based on the token and/or the password to Kerberos for purposes of authentication. A problem remains, in that a key must be established to encrypt the ticket that Kerberos sends to the workstation:

(a) Both the workstation and the authentication server know the user's password. The password is unsuitable as a shared key, however, because it is potentially subject to a dictionary attack;

(b) Both the workstation and the authentication server know, or can compute, the token. The token must be short enough for the user to enter reliably, however. The token cannot practically be more than about 8 or 9 digits and thus is subject to attack via exhaustive search;

(c) The secret key stored in the token generator would be a sufficiently secure shared key, but the workstation knows only the token that the user has typed in, not the secret key itself.

BRIEF SUMMARY OF THE INVENTION

An illustrative system in accordance with the present invention is directed at the problems set forth above. Under this system, a workstation exchanges data with an authentication server to obtain access to a desired computing system, which may include the authentication server. Communications within this system are secure whether or not the connection between the workstation and the authentication server is subject to eavesdropping. An exemplary embodiment of the invention is implemented in a computing network that includes an authentication server, as well as one or more workstations that may be connected to a number of resources, such as disk storage mechanisms, communications equipment, printers, and other computers. The workstations interact with one or more authentication token generators and one or more users.

In one embodiment of the invention, each workstation additionally includes a passive token generator that provides a unique, ongoing sequence of "tokens" as a function of time. The user initiates communications with the authentication server by entering his "password" into the workstation. The user additionally enters a token provided by the passive token generator. Then, the workstation calculates a "transmission code" by applying a first, cryptographically secure hashing algorithm to the password and the token, so that this information can be securely sent to the server.

Upon receiving the transmission code, the server attempts to determine the token and the password upon which the transmission code was calculated. More particularly, the server utilizes another passive token generator that generates tokens substantially identical to those of the workstation's token generator to identify possible tokens that might have been generated just prior to the server's receipt of the transmission code; moreover, the server retrieves a stored list of all passwords from disk storage.

If any password/token combination produces the received transmission code, that password and token constitute a valid combination, and the user should therefore be granted access to the desired computing system. Accordingly, the server sends the workstation a message encrypted using a secret key that comprises a session code computed by applying a second cryptographically secure hashing algorithm to the password and token. The first and second hashing algorithms are substantially different. After decrypting the message, the workstation may use the message (1) as a "ticket" to gain access to the desired system for a selected period of time, or (2) as a session-specific shared secret key to encrypt and decrypt subsequent communications with the desired computing system.

In another illustrative embodiment of the invention, the user initiates communications with the authentication server by entering the user's user name into the workstation. The workstation transmits the user name to the authentication server. Upon receiving the user name, the server verifies that the user name is a valid user name, in that it corresponds to an approved user of the computing network.

In this embodiment, the workstation and the server are provided with substantially identical active token generators that function to provide a unique "response" upon receipt of a "challenge." After validating the user name, the server (1) arbitrarily selects a "challenge," (2) uses its active token generator to obtain the "response" to the challenge, and (3) generates a session code by performing a hashing algorithm upon the response and the user's password. The server uses the session code as a secret key to encrypt a message, and then transmits the encrypted message along with the challenge to the workstation.

The workstation displays the received challenge to the user, who inputs it into the second active token generator; the second active token generator then supplies the unique response to the user. The user enters the unique response into the workstation, and the workstation then generates the session code based upon the user's password and the unique response. Then the workstation uses the session code to decrypt the encrypted message. The workstation may use the decrypted message (1) as a "ticket" to gain access to the desired system for a selected period of time, or (2) as a session-specific shared secret key to encrypt and decrypt subsequent communications with the desired computing system.

DESCRIPTION OF DRAWINGS

The nature of the invention, as well as objects and advantages thereof, will become more apparent to those skilled in the art after considering the following detailed description in connection with the accompanying drawings, in which like reference numerals designate like parts throughout, wherein.

DESCRIPTION OF SPECIFIC EMBODIMENTS

Structure

Figure 5:
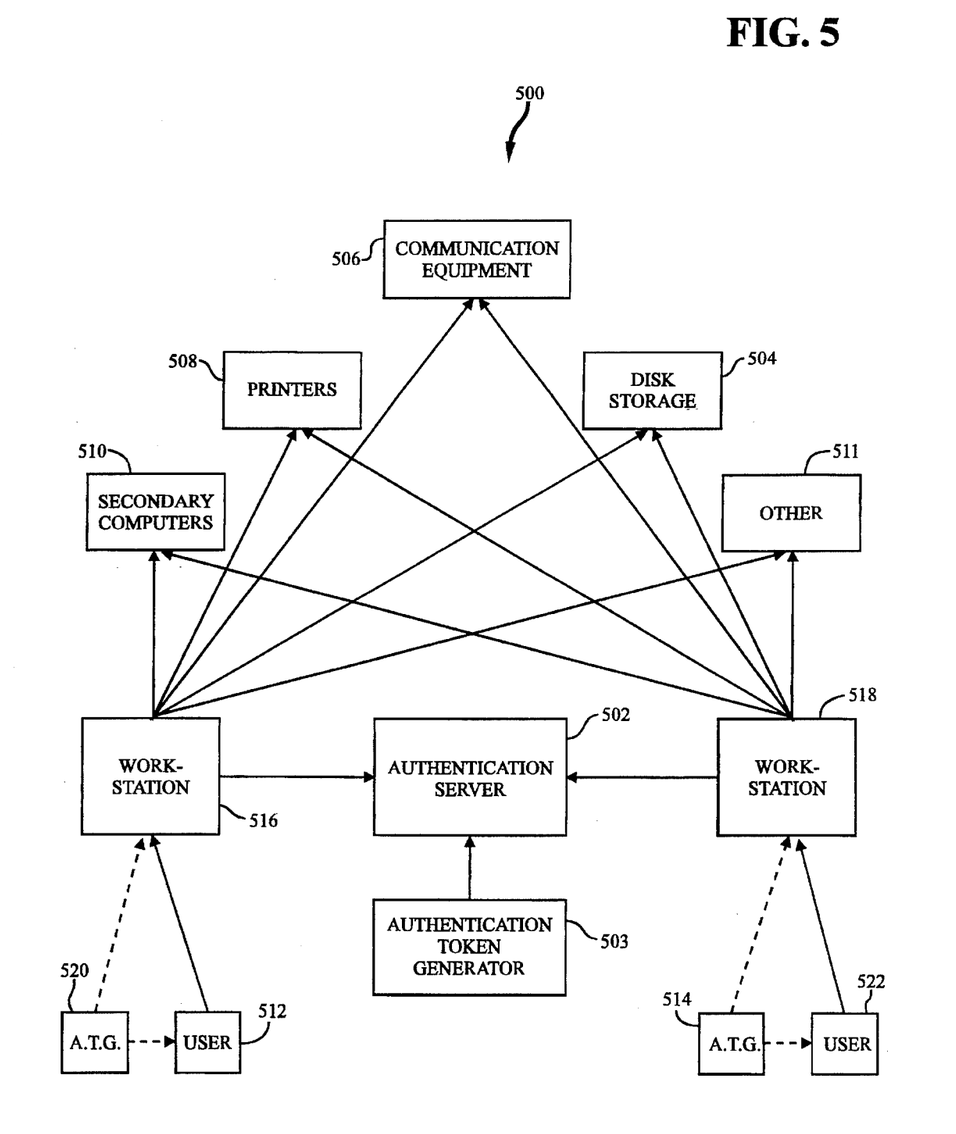
FIG. 5 is a block diagram illustrating a computer-based network 500 in which the present invention may be implemented.

The present invention may be implemented in a computing network such as the network 500 of FIG. 5, where each hardware component may be a conventional, commercially available product. The network 500 includes an authentication server 502, which restricts unauthorized users from accessing the network 500, and "authenticates" proper users of the network 500. The server 502 may be a VAX model computer such as the VAX 6000, manufactured by Digital Equipment Corporation, or any other desired computer capable of being programmed to function as a conventional authentication server. The server 502 of course could perform other functions as well, for example, as would a workstation in a peer-to-peer network. The authentication server 502 is connected to a passive authentication token generator 503 to assist the authentication server 502 in interacting with one or more users 512, 514, which utilize the services of the network 500. In one embodiment, the token generator 503 may be a routine executing as part of the control programming of the authentication server 502; of course, the token generator 503 could equivalently be implemented in separate hardware, such as a suitably programmed general purpose processor or a dedicated "hard wired" circuit.

In accordance with the invention, each user 512, 514 is provided with a workstation 516, 518. Each workstation 516, 518 may be connected to a number of resources such as one or more disk storage mechanisms 504; communications equipment 506 such as modems (not shown); printers 508; secondary computers 510; and other equipment 511. For clarity of illustration, FIG. 5 only shows a limited number of interconnections and components. Each user 512, 514 is also provided with a passive authentication token generator 520, 522 to assist the user 512, 514 in interacting with the authentication server 502. The token generators 520, 522 may, for example, comprise units such as SecurID™ units made by Security Dynamics, Inc of Cambridge, Mass. As described in greater detail below, the token generators 520, 522 may instead comprise active token generators, in accordance with an alternative embodiment of the invention.

Operation

According to the present invention, when a user 512 or 514 verifies his identity to the server 502, the server 502 provides the workstation 516 or 518 with an encrypted message. This message may comprise, for example, a "ticket" that is useful in "logging in" to a desired computing system such as a Kerberos network, the network 500, or another network, for a selected time period. Alternatively, the message may comprise data to be used in encrypting and decrypting subsequent communications between the workstation 516 or 518 and the desired computing system.

For explanatory purposes, the description herein will refer to the user 512 and the workstation 516, although this description is equally applicable to the user 514 and the workstation 518, and to other workstations (not shown) that may be connected to the server 502.

Figure 6:
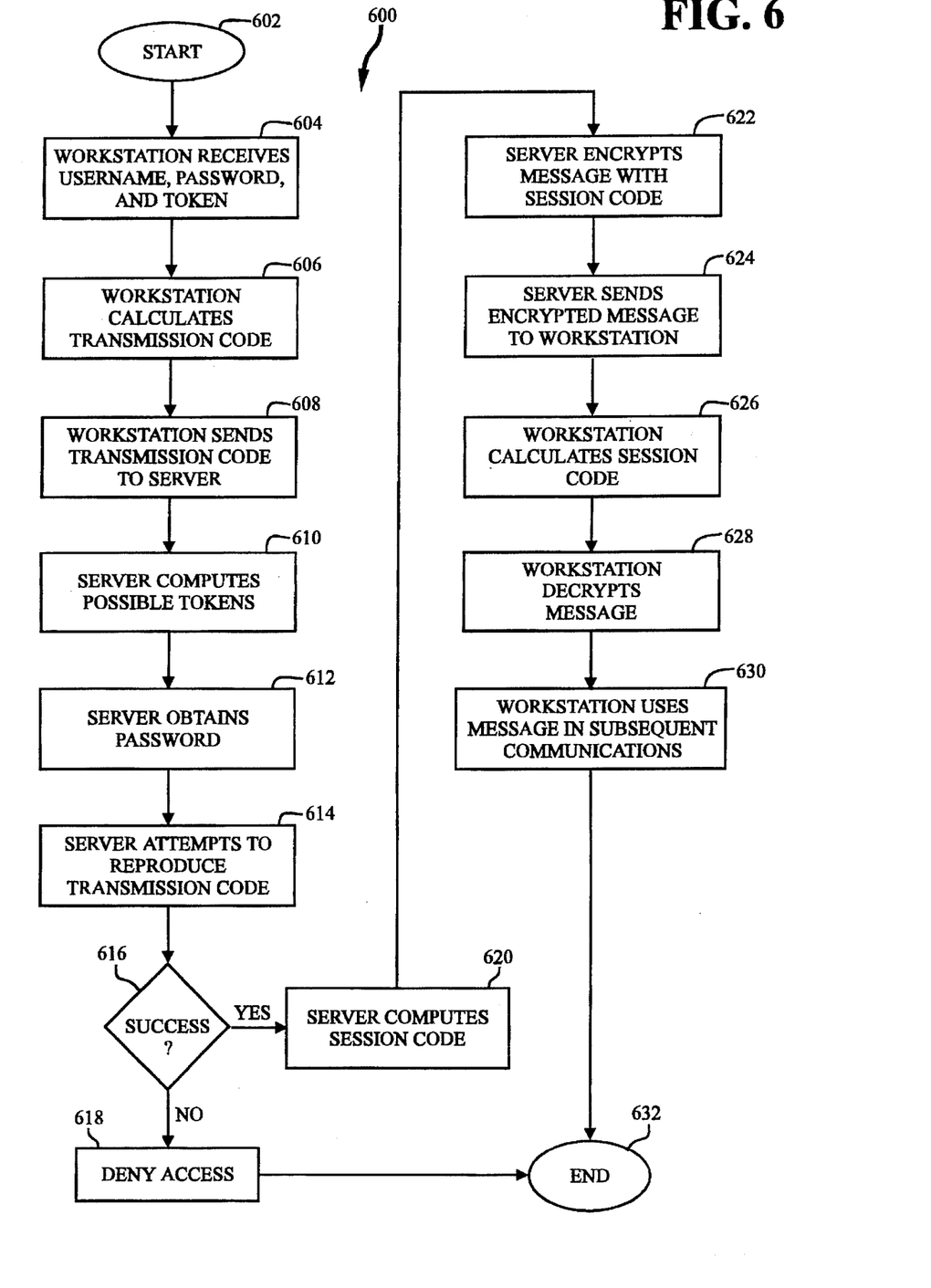
FIG. 6 is a flowchart illustrating a routine 600 of a first implementation of the present invention.

When the user 512 desires to obtain access to the desired computing system in accordance with the invention, the user 512 initiates the routine 600 in task 602 of FIG. 6. In task 604, the workstation 516 receives: (1) the user name of the user 512, which identifies the user 512 to the network 500; (2) the "password" of the user 512, which comprises a sequence of numeric, alphabetic, alphanumeric, or other characters unique to the user 512; and (3) a token, obtained from the token generator 520. In an exemplary implementation of the invention, the workstation 516 receives the user name, password, and token from the user 512, who enters these items on a keyboard (not shown) associated with the workstation 516. Alternatively, the token may be communicated directly to the workstation 516 from the token generator 520 via a bar code reader, electrical link, radio link, or other automated means.

In one embodiment of the invention, the token generator 520 comprises a device such as a "smart card" (not shown), which provides a continuous sequence of non-predictable numbers determined by performing a mathematical operation on a number supplied by a clock (not shown) contained in the token generator 520. Instead of using a clock, it is also contemplated that the token may be computed based upon a constantly changing source, such as a stock market ticker, that is available to both of the token generators 503, 520.

In task 606, the workstation 516 computes a "transmission code" based upon the password and the token. The transmission code is calculated by using a first "hashing algorithm." As used herein, "hashing algorithm" is used to describe a one-way routine for transmuting multiple input data items, by concatenating selected items of the input data and performing a "hashing equation" upon one or more items of the input data, in a specified order. As used herein, "hashing equation," is understood to include any one-way routine for transmuting a single input data item of numeric, alphabetic, or alphanumeric characters into an output sequence of characters, wherein the input data item cannot be readily derived from the output sequence. Hashing equations are also understood to be consistent, in that each time a particular hashing equation is performed on a given input data item, the hashing equation produces the same output sequence. In an exemplary embodiment of the invention, the first hashing algorithm utilizes a hashing equation such as RSA Data Security's RSA MD2, RSA MD4, or RSA MD5, or the National Institute for Science and Technology proposal entitled "DHA" (Digital Hash Algorithm).

In an illustrative implementation, the first hashing algorithm may comprise any of the exemplary hashing algorithms 1.0–1.3, set forth below.

| [1.0] | hash(token ¦ hash(password)) |

| [1.1] | hash(hash(password ¦ token) |
| [1.2] | hash(token ¦ password) |
| [1.3] | hash(password ¦ token) |

In the hashing algorithms 1.0–1.3, the "¦" symbol represents the concatenation operation. The hashing algorithm 1.0, explained more fully, comprises the following operations: the password is modified by the selected hashing equation, the modified password is concatenated onto the token to form a concatenation, and this concatenation is modified by the hashing equation. The system may be designed so that a specified single hashing algorithm, such as one of the algorithms 1.0–1.3, is used at all times; alternatively, a number of variations are contemplated, such as the use of a selected algorithm during specified time periods by specified workstations, and the like.

After the transmission code is computed in task 606, the workstation 516 sends the transmission code to the server 502 in task 608. Upon receiving the transmission code, the server 502 in task 610 attempts to identify the token used by the workstation 516 in calculating the transmission code. To identify the token, the server 502 utilizes its token generator 503, as well as a memory (not shown) where the server 502 maintains a listing of the most recent tokens provided by the token generator 503. In the illustrative implementation, the token generator 503 also contains a clock (not shown) that is substantially synchronized with the clocks of the token generators 520, 522. The token generator 503 is thus able to provide a sequence of characters that is identical to the characters provided by the token generators 520, 522. Based on the time at which the server 502 received the transmission code in task 608, the server 502 estimates a "window" of time during which the transmission code was likely to have been sent. By retrieving from memory all tokens produced by the token generator 503 during the window of time, the server 502 effectively compiles a list of tokens that includes the token used by the workstation 516 to calculate the transmission code in task 606.

Having compiled this list of possible tokens, the server 502 in task 612 then accesses a list cross-referencing the user names and passwords of all users 512, 514 of the network 500. The server 502 searches this list for the user name received in task 604, and then identifies the password of the user 512.

Then, in task 614 the server 502 attempts to duplicate the transmission code received in task 608. Specifically, the server 502 calculates all possible transmission codes, based on all possible combinations of the identified password and a different possible token. To arrive at the same transmission code calculated in task 606, the server 502 utilizes the first hashing algorithm used by the workstation 516 in task 606. As discussed above, the first hashing algorithm may comprise one of the exemplary first hashing algorithms 1.0–1.3.

In an alternate embodiment of the invention, the server 502 in task 612 accesses a list cross-referencing hashed user names with hashed passwords. In this embodiment, the server 502 performs the proper hashing equation on the user name, and searches the list to identify the hashed password cross-referenced against the hashed user name. After this, the server 502 proceeds in task 614 to repetitively perform the appropriate calculation needed to obtain the transmission code. This embodiment is applicable when the session code is calculated from data comprising a token and a hashed password, using a hashing algorithm such as the hashing algorithm 1.0 or 1.1. Still another embodiment is contemplated, wherein the server 502 in task 612 retrieves a list containing only passwords or hashed passwords. In this embodiment, the server 502 in task 614 repetitively performs the proper hashing algorithm upon possible tokens and possible passwords or possible hashed passwords to produce the transmission code, methodically progressing through every possible combination of token and password or hashed password. Unlike the embodiments described above, in this embodiment, it is unnecessary for the workstation 516 to transmit the user name in task 604, since all passwords from the stored list are sequentially tried.

After task 614, query 616 asks whether any of the repetitive calculations of task 614 yielded the transmission code received by the server 502 in task 608. If not, then the server 502 concludes that the combination upon which the transmission code was based is invalid, and the server 502 denies access to the user 512 in task 618, and ends in task 632.

However, if any of the repetitive calculations of task 614 yielded the transmission code received by the server 502 in task 608, this indicates that the token and password used in the successful calculation constitute a valid combination, and the user 512 should be provided with access to the desired system.

In this case, the server 502 in task 620 computes a session code by performing a second hashing algorithm on the password and the token. The second hashing algorithm is substantially different than the first hashing algorithm calculated in task 606. Specifically, the second hashing algorithm differs from the first hashing algorithm in that it (1) utilizes a different hashing equation, (2) utilizes the same hashing equation, but operates upon the password and token in a different order, or (3) or otherwise differs substantially from the first hashing algorithm of task 606, such that the session code cannot be readily derived from the transmission code. In this way, even if an eavesdropper were to learn of the transmission code, the eavesdropper could not calculate the session code. In an exemplary embodiment, the second hashing algorithm comprises any one of the illustrative hashing algorithms 1.0–1.3 (described above), but not the same hashing algorithm as the first hashing algorithm used in task 606.

After computing the session code in task 620, the server 502 in task 622 encrypts a message using the session code as a secret key, and in task 624 sends the encrypted message to the workstation 516. After the message is received by the workstation 516, the workstation 516 calculates the session code in task 626, and decrypts the message using the session code as a secret key in task 628. Then, in task 630 the workstation may use the message: (1) as a "ticket" to gain access to the desired system for a selected period of time, or (2) as a session-specific shared secret key to encrypt and decrypt subsequent communications with the desired system.

Another implementation of the invention is contemplated wherein the token generators 503,520 are substantially identical "active" token generators, rather than "passive" token generators. The workstation 516 uses the active token generator 520 to assist in decrypting a message received from the server 502. In this embodiment, the workstation 516 initiates communications with the authentication server 502 by transmitting the user name of the user 512. The server 502 provides the workstation 516 with a "challenge" and a message encrypted with a session code comprising a hashed combination of a "response" and the password of the user 512. The message may be decrypted by the following sequence of events: the user 512 inputs the challenge into the active token generator 520 to obtain the response, the user 512 inputs the obtained response into the workstation 516, the workstation 516 reproduces the session code, and the workstation 516 uses the session code as a secret key to decrypt the message according to a predetermined encryption algorithm.

Figure 7:
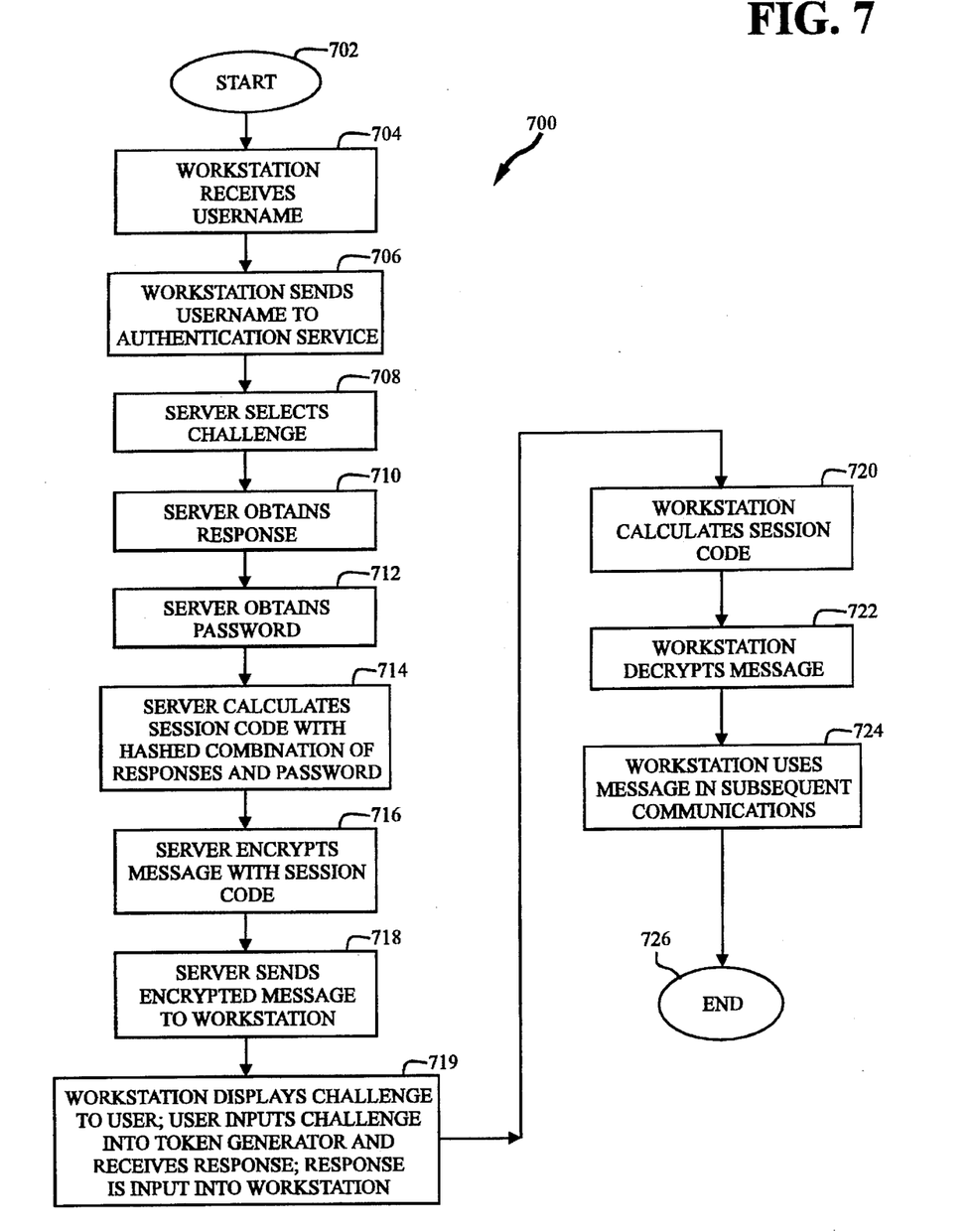
FIG. 7 is a flowchart illustrating a routine 700 of a second implementation of the present invention.

More specifically, these steps are performed according to a routine comprising a routine 700, shown in FIG. 7. After the routine 700 is initiated in task 702, the workstation 516 in task 704 receives the user name of the user 512. In an exemplary implementation of the invention, the workstation 516 receives the user name from the user 512, who enters the user name on a keyboard (not shown) associated with the workstation 516. Then, the workstation 516 in task 706 sends the user name to the authentication server 502. In task 708, the server 502 arbitrarily selects a "challenge," comprising an alphanumeric, numeric, or other character sequence. In task 710, the server 502 then enters the challenge into the active token generator 503 to produce a given "response", unique to that challenge. The same challenge, when input into the token generator 520, would produce the identical response.

In task 712, the server 502 identifies the password of the user 512 by consulting a list of cross-referenced user names and passwords. Then, in task 714 the server 502 generates a session code by performing a selected hashing algorithm upon the response and the password. As illustrative examples, the session code may be calculated using any of the hashing algorithms 1.0–1.3 discussed above.

In an alternate embodiment, the server 502 in task 712 retrieves a list cross-referencing the user names with hashed passwords. In this case, the server 502 searches the list to identify the hashed password cross-referenced against the user name received in task 704. Having identified the hashed password of the user 512, the server 502 may then utilize the hashed password to calculate the session code.

After calculating the session code, the authentication server 502 in task 716 encrypts a message using the session code as a secret key, and in task 718 transmits the encrypted message and the challenge to the workstation 516. In task 719, the workstation 516 displays the challenge to the user 512, and the user 512 inputs the challenge into the active token generator 520. The token generator 520 provides the user 512 with the same response that was received by the server 502 in task 710. The workstation 516 then receives the response; in an exemplary implementation of the invention, the workstation 516 receives the response from the user 512, who enters it on a keyboard (not shown) associated with the workstation 516. Alternatively, the response may be communicated directly to the workstation 516 from the token generator 520 via a bar code reader, electrical link, radio link, or other automated means. After receiving the response in task 719, the workstation 516 in task 720 calculates the session code with the same hashing algorithm that was used by the authentication server 502 in task 714. As explained above, this algorithm may comprise any one of the hashing algorithms 1.0–1.3, in an exemplary embodiment. In task 722 the workstation 516 uses the calculated session code as a secret key to decrypt the message. Then, in task 724 the workstation may use the message: (1) as a "ticket" to gain access to the desired system for a selected period of time, or (2) as a session-specific shared secret key to encrypt and decrypt subsequent communications with the desired system.

Conclusion

While there have been shown what are presently considered to be preferred embodiments of the invention, it will be apparent to those skilled in the art that various changes and modifications can be made herein without departing from the scope of the invention as defined by the appended claims.

What is claimed is:

1. A method for securely accessing a computing system, comprising the steps of:
   (a) a workstation receiving a token from a first passive authentication token generator and receiving a secret password associated with a user;
   (b) the workstation generating a transmission code by performing a first hashing algorithm upon data comprising:
      (1) the token and
      (2) the secret password;
   (c) the workstation sending the transmission code to an authentication server;
   (d) the server receiving and verifying the validity of the transmission code;
   (e) if the transmission code is valid, the server transmitting to the workstation a message encrypted with a session code generated by performing a second hashing algorithm upon data comprising the token and the password, the second hashing algorithm being substantially different than the first hashing algorithm;
   (f) the workstation receiving the message;
   (g) the workstation computing the session code by performing the second hashing algorithm on the password and the token; and
   (h) the workstation using the session code to decrypt the message.

2. The method of claim 1, wherein the step of generating the transmission code comprises the steps of:
   (1) hashing the password according to a selected one-way hashing equation;
   (2) concatenating the token onto the hashed password to form a concatenation; and
   (3) hashing the concatenation according to the selected one-way hashing equation.

3. The method of claim 1, wherein the step of generating the transmission code comprises the steps of:
   (1) hashing the password according to a selected one-way hashing equation;
   (2) concatenating the hashed password onto the token to form a concatenation; and
   (3) hashing the concatenation according to the selected one-way hashing equation.

4. The method of claim 1, wherein the step of generating the transmission code comprises the steps of:
   (1) concatenating the token onto the password to form a concatenation; and
   (2) hashing the concatenation according to the selected one-way hashing equation.

5. The method of claim 1, wherein the step of generating the transmission code comprises the steps of:
   (1) concatenating the password onto the token to form a concatenation; and
   (2) hashing the concatenation according to the selected one-way hashing equation.

6. The method of claim 1, wherein the step of verifying the validity of the transmission code comprises the steps of:
   (1) the server utilizing a second passive authentication token generator that simultaneously supplies tokens substantially identical to those of the first passive token generator to identify possible tokens occurring at the time the workstation sent the transmission code to the server;
   (2) the server identifying one or more passwords from a stored list; and
   (3) the server attempting to reproduce the transmission code by performing the first hashing algorithm on the identified one or more passwords and different identified possible tokens in turn.

7. The method of claim 6, wherein step (2) comprises the step of utilizing a user name received from the workstation to identify a single password from a cross-referenced list of user names and passwords.

8. The method of claim 1, wherein the step of verifying the validity of the transmission code comprises the steps of:
   (1) the server utilizing a second passive authentication token generator that simultaneously supplies tokens substantially identical to those of the first passive token generator to identify possible tokens occurring at the time the workstation sent the transmission code to the server;
   (2) the server identifying one or more hashed passwords from a stored list; and
   (3) the server attempting to reproduce the transmission code by performing the first hashing algorithm on the identified one or more hashed passwords and different identified possible tokens in turn.

9. The method of claim 8, wherein step (2) comprises the step of utilizing a user name received from the workstation to identify a single hashed password from a cross-referenced list of user names and hashed passwords.

10. The method of claim 1, wherein the step of generating the session code comprises the steps of:
    (1) hashing the password according to a selected one-way hashing equation;
    (2) concatenating the token and the hashed password to form a concatenation; and
    (3) hashing the concatenation according to the selected one-way hashing equation.

11. The method of claim 1, wherein the step of generating the session code comprises the steps of:
    (1) hashing the token according to a selected one-way hashing equation;
    (2) concatenating the hashed token and the password to form a concatenation; and
    (3) hashing the concatenation according to the selected one-way hashing equation.

12. The method of claim 1, wherein the step of generating the session code comprises the steps of:
    (1) concatenating the token onto the password to form a concatenation; and
    (2) hashing the concatenation according to the selected one-way hashing equation.

13. The method of claim 1, wherein the step of generating the session code comprises the steps of:
    (1) concatenating the password onto the token to form a concatenation; and
    (2) hashing the concatenation according to the selected one-way hashing equation.

14. The method of claim 1, further comprising the step of the workstation using the message to encrypt subsequent communications between the workstation and a desired computing system.

15. The method of claim 1, further comprising the step of the workstation using the session code to decrypt subsequent communications between the workstation and a desired computing system.

16. The method of claim 1, additionally including the step of the authentication server maintaining a log of verified transmission codes.

17. The method of claim 1, wherein the step of the workstation receiving the password is accomplished by a user typing the password upon keys of a data entry device.

18. The method of claim 1, wherein the step of the workstation receiving the token is accomplished by a user typing the token upon keys of a data entry device.

19. The method of claim 1, wherein the token is generated by the first authentication token generator based upon an external reference.

20. The method of claim 1, wherein the step of the workstation receiving the token is accomplished by an electrical link.

21. The method of claim 1, wherein the step of the workstation receiving the token is accomplished by the workstation reading a bar code provided by the first authentication token generator.

22. A secure method for obtaining access to a computing system, wherein a workstation performs steps comprising:
  (a) receiving an initial password and an initial token, wherein the initial password is supplied by a user and the initial token is supplied by a first authentication token generator;
  (b) generating a transmission code by performing a first hashing algorithm upon the password and the token;
  (c) sending the transmission code to an authentication server having a second authentication token generator that simultaneously supplies tokens substantially identical to those provided by the first authentication token generator;
  (d) if the authentication server successfully reproduces the transmission code by performing successive calculations utilizing different combinations of possible tokens occurring at the time the transmission code was sent and one or more passwords identified from a list of passwords accessible by the authentication server, then receiving a message from the authentication server that is encrypted with a selected secret key routine using a session code obtained by performing a second hashing algorithm upon data comprising the initial token and the initial password, the second hashing algorithm being substantially different than the first hashing algorithm.

23. The method of claim 22, wherein the workstation additionally performs steps comprising:
  (1) decrypting the message; and
  (2) utilizing the message to encrypt subsequent communications with a desired computing system.

24. The method of claim 22, wherein the workstation additionally performs steps comprising:
  (1) decrypting the message; and
  (2) utilizing the message to decrypt subsequent communication with a desired computing system.

25. A secure method for obtaining access to a computing system,
  wherein an authentication server performs steps comprising:
  (a) receiving a transmission code from a workstation, the transmission code generated by performing a first hashing algorithm upon data comprising an initial password received from a user and an initial token provided by a first passive authentication token generator;
  (b) utilizing a second passive authentication token generator that simultaneously provides tokens substantially identical to those supplied by the first passive authentication token generator to identify possible tokens occurring at the time the workstation sent the transmission code, identifying one or more passwords from a list of passwords accessible by the authentication server, and attempting to reproduce the transmission code by performing successive calculations utilizing different combinations of the possible tokens and one or more identified passwords;
  (c) if the server in step (b) successfully reproduced the transmission code, then providing the workstation with a message encrypted with a selected secret key routine using a session code generated by performing a second hashing algorithm upon the initial token and the initial password, wherein the second hashing algorithm is substantially different than the first hashing algorithm.

26. In a system including a workstation, an authentication server, and a token generator, a signal comprising a hashed version of a first signal computed from data including a user-supplied password and a token supplied by a token generator.

27. In a system that includes a workstation and an authentication server, a signal comprising a hashed version of a first signal computed from data including a token supplied by a token generator and a user-supplied password.

28. A method for securely accessing a computing system, comprising the steps of:
  (a) a workstation receiving a user name associated with a user;
  (b) the workstation transmitting the user name to an authentication server;
  (c) the authentication server verifying the validity of the user name, and if the user name is valid:
    (1) selecting a challenge;
    (2) obtaining a response by inputting the challenge into a first active authentication token generator;
    (3) generating a session code by performing a first hashing algorithm on data comprising the response and a password associated with the user;
    (4) encrypting a message with the session code;
    (5) transmitting the challenge and the encrypted message to the workstation; and
  (d) the workstation receiving the challenge and the encrypted message;
  (e) the workstation obtaining the response by inputting the challenge into a second active authentication token generator that generates tokens substantially identical to those generated by the first active authentication token generator, and using the response and the password to generate the session code and decrypt the message.

29. The method of claim 28, wherein the step of the workstation receiving the user name is accomplished by the user typing the user name upon keys of a data entry device.

30. The method of claim 28, wherein the step of generating the session code comprises the steps of:
  (1) concatenating the response onto a password associated with the user to form a concatenation; and
  (2) hashing the concatenation according to the selected one-way hashing equation.

31. The method of claim 28, wherein the step of generating the session code comprises the steps of:
  (1) concatenating a password associated with the user onto the response to form a concatenation; and (2) hashing the concatenation according to the selected one-way hashing equation.

32. The method of claim 28, wherein the step of generating the session code comprises the steps of:

(1) hashing a password associated with the user according to a selected one-way hashing equation;

(2) concatenating the hashed password and the response to form a concatenation; and (3) hashing the concatenation according to the selected one-way hashing equation.

33. The method of claim 28, wherein the step of generating the session code comprises the steps of:

(1) hashing the response according to a selected one-way hashing equation;

(2) concatenating the response and a password associated with the user to form a concatenation; and (3) hashing the concatenation according to the selected one-way hashing equation.

34. The method of claim 28, wherein the step of verifying the validity of the user name comprises the step of the server accessing a database of user names and determining whether the user name appears in the database.

35. The method of claim 28, wherein the step of verifying the validity of the user name comprises the step of the server accessing a database of hashed user names and determining whether the user name appears in the database.

36. The method of claim 28, further comprising the step of the workstation using the message to encrypt subsequent communications between the workstation and a desired computing system.

37. The method of claim 28, further comprising the step of the workstation using the message to decrypt subsequent communications between the workstation and a desired computing system.

\* \* \* \* \*